(12) United States Patent
Liaw et al.

(10) Patent No.: US 8,861,545 B2
(45) Date of Patent: *Oct. 14, 2014

(54) METHOD FOR PERFORMING PROTOCOL TRANSLATION IN A NETWORK SWITCH

(75) Inventors: Fong Liaw, Cupertino, CA (US); Jan Medved, Pleasanton, CA (US); Abbas Morshed, Los Altos, CA (US); Yijun Xiong, Plano, TX (US); John Z. Yu, Santa Clara, CA (US)

(73) Assignee: Brixham Solutions Ltd., Tortola (VG)

( * ) Notice: Subject to any disclaimer, the term of this patent is extended or adjusted under 35 U.S.C. 154(b) by 203 days.

This patent is subject to a terminal disclaimer.

(21) Appl. No.: 13/117,768

(22) Filed: May 27, 2011

(65) Prior Publication Data
US 2011/0228782 A1 Sep. 22, 2011

Related U.S. Application Data

(63) Continuation of application No. 10/646,340, filed on Aug. 21, 2003, now Pat. No. 7,970,009.

(51) Int. Cl.
*H04L 12/56* (2006.01)
(52) U.S. Cl.
USPC .......................................... 370/466; 370/469
(58) Field of Classification Search
None
See application file for complete search history.

(56) References Cited

U.S. PATENT DOCUMENTS

| | | | |
|---|---|---|---|
| 5,610,918 A | | 3/1997 | Kamo et al. |
| 5,675,642 A | | 10/1997 | Sone |
| 5,764,750 A | | 6/1998 | Chau et al. |
| 5,905,873 A | * | 5/1999 | Hartmann et al. ............ 709/249 |
| 6,012,095 A | * | 1/2000 | Thompson et al. ........... 709/231 |
| 6,047,002 A | * | 4/2000 | Hartmann et al. ............ 370/466 |
| 6,144,669 A | * | 11/2000 | Williams et al. .............. 370/401 |
| 6,160,819 A | * | 12/2000 | Partridge et al. .............. 370/474 |
| 6,189,038 B1 | * | 2/2001 | Thompson et al. ........... 709/231 |
| 6,201,809 B1 | * | 3/2001 | Lewin et al. .................. 370/392 |
| 6,205,152 B1 | * | 3/2001 | Von Ahnen et al. ..... 370/395.63 |
| 6,463,477 B1 | | 10/2002 | Fontenot |
| 7,065,585 B2 | * | 6/2006 | Ohyoshi et al. ............... 709/242 |
| 7,082,121 B1 | | 7/2006 | Stammers et al. |
| 7,970,009 B1 | * | 6/2011 | Liaw et al. .................... 370/466 |
| 2002/0065073 A1 | | 5/2002 | Natani et al. |
| 2002/0152319 A1 | | 10/2002 | Amin et al. |
| 2003/0081624 A1 | * | 5/2003 | Aggarwal et al. ............. 370/412 |
| 2004/0120502 A1 | | 6/2004 | Strathmeyer et al. |
| 2005/0201387 A1 | * | 9/2005 | Willis ....................... 370/395.52 |

* cited by examiner

*Primary Examiner* — Hassan Kizou
*Assistant Examiner* — Roberta A Shand
(74) *Attorney, Agent, or Firm* — Amin, Turocy & Watson, LLP

(57) ABSTRACT

A system and method are disclosed for processing a packet. Processing the packet comprises receiving the packet; translating the packet from a first protocol-specific format to a canonical packet format; translating the packet from the canonical packet format to a second protocol-specific format; and forwarding the packet.

19 Claims, 9 Drawing Sheets

Logical Protocol
Translation Diagram

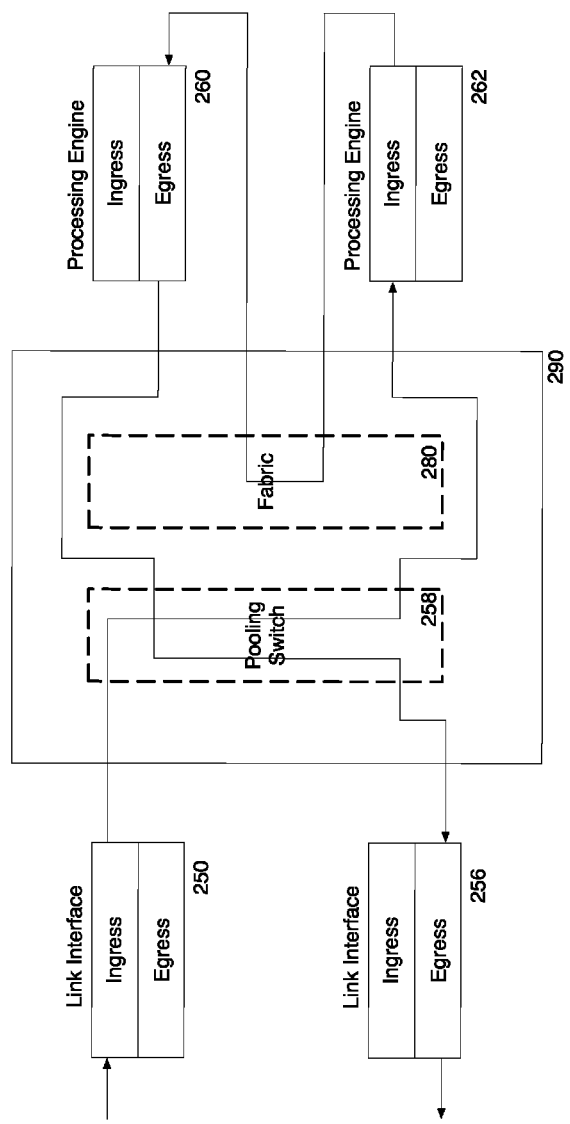
Figure 2 - Physical Data Path Diagram

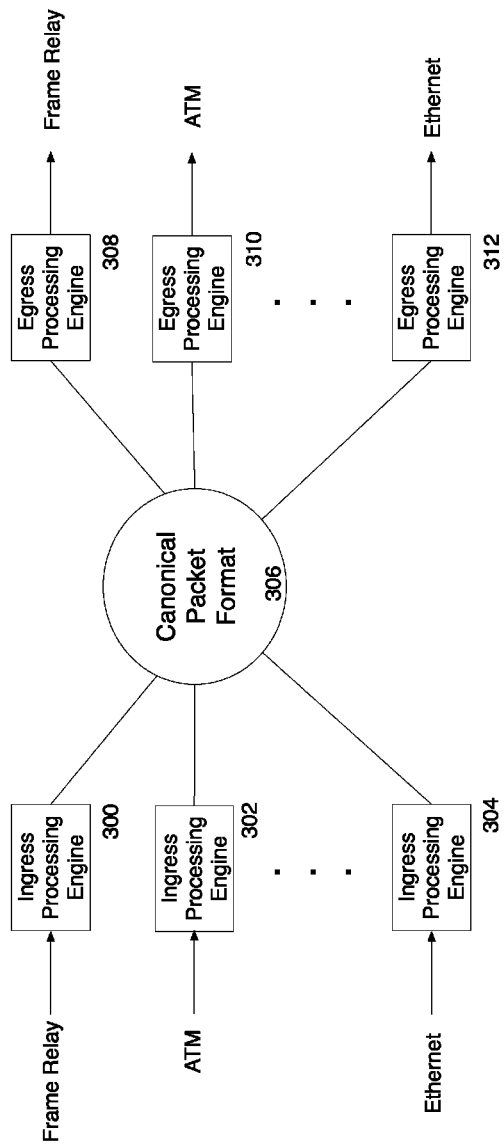

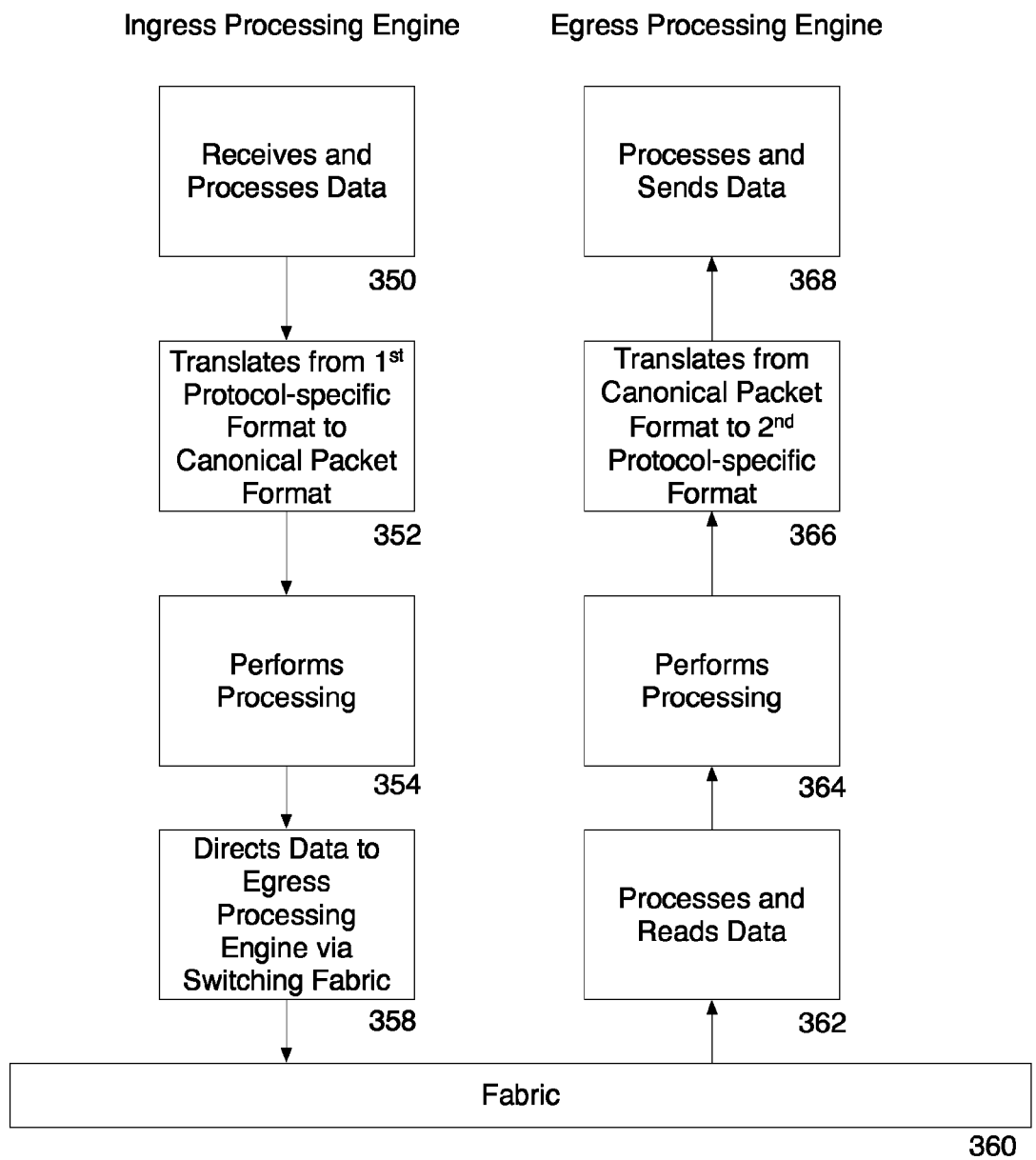
Figure 3B - Translation Function Diagram

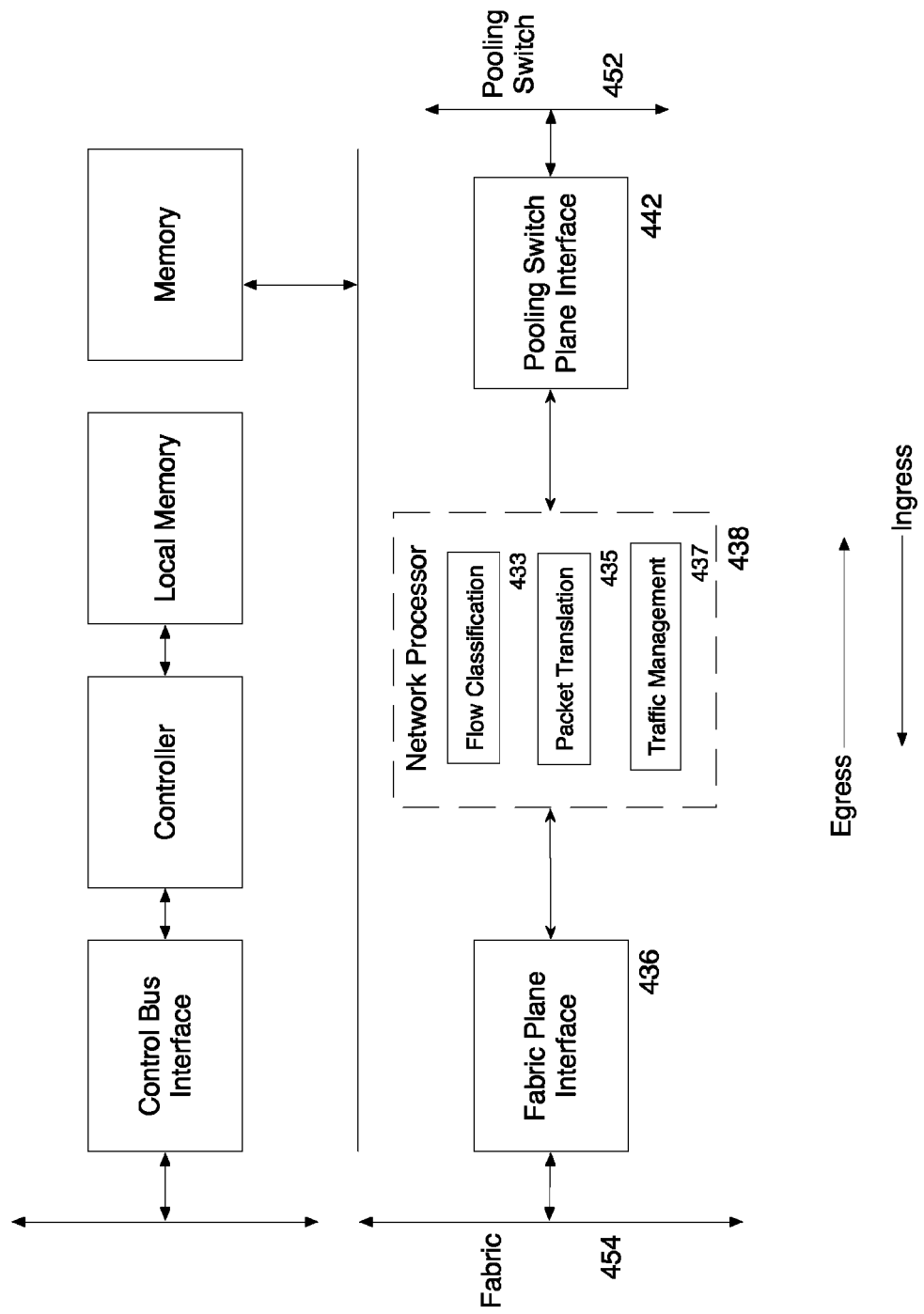
Figure 4 - Processing Engine

Figure 6 - Canonical Packet Format - Logical Diagram

METHOD FOR PERFORMING PROTOCOL TRANSLATION IN A NETWORK SWITCH

CROSS REFERENCE TO OTHER APPLICATIONS

The present application is a continuation of U.S. application Ser. No. 10/646,340, filed Aug. 21, 2003, titled METHOD FOR PERFORMING PROTOCOL TRANSLATION IN A NETWORK SWITCH. The entire disclosure of U.S. application Ser. No. 10/646,340 is considered as being part of the disclosure of the present application and is hereby incorporated by reference herein in its entirety.

BACKGROUND OF THE INVENTION

The present invention relates generally to communications network switches. More specifically, an improved method for performing protocol translation is disclosed.

BACKGROUND OF THE INVENTION

Network switches typically include ingress ports to receive data from one side, egress ports to send out data to the other side, and a switching fabric to cross-connect between ingress ports and egress ports. In packet communication networks, data is formed in a packet format which includes a packet header and a packet payload: the packet header specifies specific protocol information, and the packet payload carries customer information. A packet received from an ingress port is classified and processed based on a service provisioning/management policy before being sent out an egress port. A typical network switch may exchange data packets between multiple transport mediums according to multiple transport protocols when an ingress port and an egress port run different protocols over different transport mediums. Protocol translation between ingress and egress ports is required when a network switch is connected with multiple transport mediums to support multiple services/protocols.

More specifically, protocol translation is required to support the following two application scenarios: (1) to perform service interworking at a network edge to translate one type service/protocol to another type service/protocol, and (2) to provide gateway function to inter-connect two networks running different network protocols to translate from one type of protocol in one network to another type of protocol in another network. Although the applications appear differently, protocol translation, or more specifically protocol-specific packet format translation, is always required. FIG. 1A is a block diagram of a typical network switch 100. Ports 110-120 exchange data via switch 100 according to multiple transport protocols. If the switch supports N protocols, the switch can translate to and from anyone of N protocols. A typical method for performing protocol translation is using N-to-N protocol mapping and implementing all $N^2$ possible protocol translations on the switch, and the protocol translation is typically performed during data ingress. For example, if the switch supports N=3 protocols where the protocols are ATM, Frame Relay, and MPLS, in principle, $N^2=9$ protocol ("uni-directional") translations are implemented as follows:

(ATM to ATM), (ATM to Frame Relay), (ATM to MPLS),
(Frame Relay to ATM), (Frame Relay to Frame Relay),
(Frame Relay to MPLS),
(MPLS to ATM), (MPLS to Frame Relay), and (MPLS to MPLS).

N-to-N protocol mapping with $N^2$ protocol translations may not be desirable for several reasons. First, the development complexity for protocol translations is $N^2$, not linear in N, which may be undesirable as N increases when new services are added to the switch. Secondly, processing tasks may be imbalanced between ingress and egress—for example, if protocol translations are mainly performed during data ingress, more processing tasks are performed during data ingress than during data egress. This may cause resource (processing power, memory, etc.) stress in data ingress and resource waste in data egress. Furthermore, adding a new service (or protocol type) to the switch requires implementing an additional 2N ("uni-directional") protocol translations.

There is a need to improve the typical protocol translation architecture in a network switch to more efficiently handle multiple protocol translations, to provide more efficient processing for better resource utilization, and to simplify the addition of new services or protocols introduced to the switch incrementally.

BRIEF DESCRIPTION OF THE DRAWINGS

The present invention will be readily understood by the following detailed description in conjunction with the accompanying drawings, wherein like reference numerals designate like structural elements, and in which:

FIG. 2 is a physical diagram of switch 140 illustrating a data path for the ingress and egress flow of data;

FIG. 3A is a logical diagram illustrating an improved protocol translation method in a switch with processing engines, such as switch 140;

FIG. 3B is a flowchart illustrating a process for the ingress and egress flow of data through the processing engines depicted in FIG. 3A;

FIG. 4 is a block diagram illustrating a processing engine that uses the improved protocol translation method, such as processing engine 160, 162, 164, or 166 in switch 140;

DETAILED DESCRIPTION

Figure 1A:
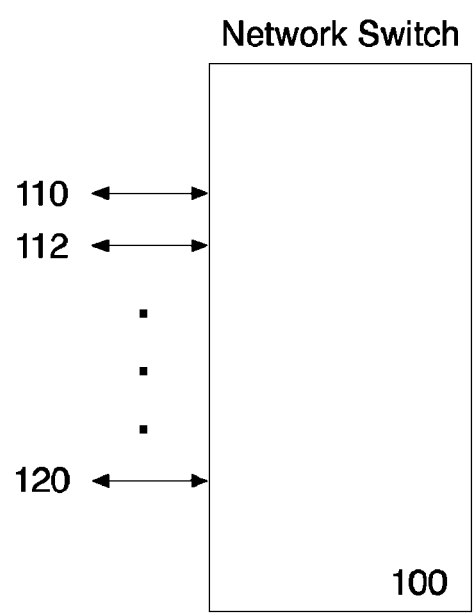
FIG. 1A is a block diagram of a typical network switch 100.

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate, by way of example, the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

An improved method for performing protocol translation on a network switch is disclosed as follows. Ingress data arriving at the switch is translated from a first protocol -specific format to a so-called Canonical Packet Format (CPF) within the switch. Egress data departing from the switch is translated from the canonical packet format to a second protocol-specific format. The canonical (or canonic) packet format is designed as a generic data packet format that can represent typical protocol-specific packet formats supported by the switch; that is, the CPF is a "superset" to accommodate packet formats from a set of typical protocols/services. Note that the first and second protocol-specific formats may be the same or nearly the same—for example, when ingress side (e.g., service side) and egress side (e.g., network side) have the same ATM protocol, the ATM UNI and NNI packet formats are nearly the same When a switch supports N protocols, the conventional method is for the switch to translate from anyone protocol at ingress to anyone protocol at egress, or N-to-N protocol mapping, which results in $N^2$ protocol translations. The improved method for performing protocol translation uses an N-to-1 protocol mapping mechanism during data ingress and a 1-to-N protocol mapping mechanism during data egress. N protocol translations are implemented on the ingress side in which N protocols are translated to a canonic packet format, and N protocol translations are implemented on the egress side in which the canonic packet format is translated to any protocol (up to N) specific to egress ports. Clearly, this requires a total of 2N, instead of $N^2$, protocol translations implemented on the switch. It decreases the protocol translation development complexity from $N^2$ in conventional method to 2N, which is linear in N and is desirable for larger N. For example, if the switch supports N=3 protocols which are ATM, Frame Relay, and MPLS, only 2N=6 protocol translations are implemented as follows:

ATM to canonical packet format, canonical packet format to ATM,
Frame Relay to canonical packet format, canonical packet format to Frame Relay;
MPLS to canonical packet format, and canonical packet format to MPLS.

Such a 1-to-N and N-to-1 protocol translation/mapping method also allows the processing tasks to be distributed between data ingress and data egress. The improved method with protocol translations occurring at both ingress and egress can flexibly partition the packet processing tasks into ingress and egress domains, and fulfill some tasks for egress packet header classification/processing. Furthermore, since the canonic packet format is used as the internal data format, adding a new service (protocol) to the switch merely requires adding support for additional two translations from the specific protocol to/from the canonic packet format. For example, to add Ethernet support to the switch in the above example, support for Ethernet-to -canonical packet format translation and canonical packet format-to-Ethernet translation is only needed. This makes adding new services incrementally to the network switch a much less complex task.

In summary, the improved method for protocol translation handles multiple protocol implementation efficiently, provides more efficient processing, and simplifies the addition of new services or protocols to the switch for service upgrade/expansion.

Figure 1B:
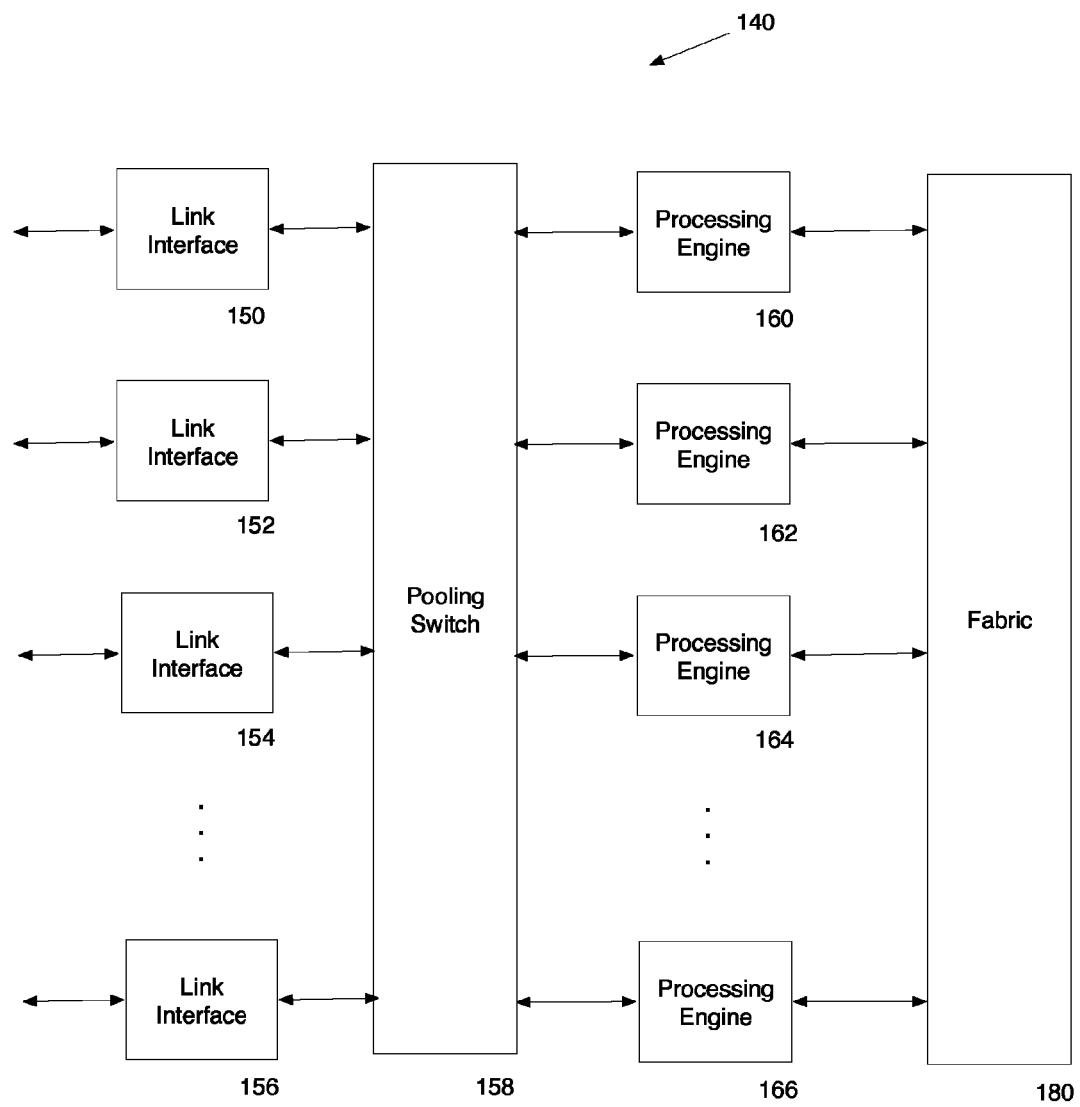
FIG. 1B is a block diagram illustrating a switch 140 that includes link interfaces 150-156, processing engines 160-166, a pooling switch 158, and a fabric switch 180.

FIG. 1B is a block diagram illustrating a switch 140 that includes link interfaces 150-156, processing engines 160-166, a pooling switch 158, and a fabric switch 180. In general, a link interface can be protocol-specific to terminate traffic in a specific protocol packet format, while a processing engine can handle any protocol for traffic processing; Pooling switch 158 is designed to inter-connect between any link interfaces and any processing engines in fine granularity, which is further described in U.S. patent application Ser. No. 10/447,825; the fabric switch provides a cross-connect between any two processing engines. The improved protocol translation method may be used with this switch architecture as well as other switch architectures. As shown in FIG. 1B, each link interface 150-156 is coupled to pooling switch 158. Pooling switch 158 is coupled to processing engines 160-166. Processing engines 160-166 are coupled to fabric switch 180 for exchanging data with each other. Fabric 180 can be any appropriate switching fabric for data cross-connect.

Each processing engine 160-166 includes an ingress processing engine for data ingress and an egress processing engine for data egress. Each processing engine can support any number of protocols supported by the switch. If the switch supports N protocols, then a processing engine may support up to N protocols in bidirection.

Preferably, each processing engine is identical and supports N protocol translations on the ingress processing engine and N protocol translations on the egress processing engine. Alternatively, the translations may be supported by more than one processing engine.

Each ingress link interface appropriately distributes ingress data to one or more ingress processing engines via pooling switch 158 so that system resources (e.g., processing power, memory, etc.) on processing engines are utilized efficiently. Upon receiving traffic data from the ingress link interface, the ingress processing engine directs the data through the egress processing engine which then forwards data to the egress link interface. During this process, the ingress processing engine translates the data from a first protocol-specific format to the canonical packet format. The egress processing engine translates the data from the canonical packet format to a second protocol-specific format. Typically, the first protocol-specific format corresponds to the ingress transport protocol and the second protocol-specific format corresponds to the egress transport protocol.

In the preferred embodiment, each processing engine 160-164 supports all the protocols supported on the switch. This enables any processing engine 160-166 to exchange data with any link interface 150-156 in switch 140. This provides switch 140 with the freedom to allocate processing engine resources without considering the protocol employed in the ingress data. The granularity of internal data switching between link interfaces and processing engines via the pooling switch can vary in different embodiments of the switch.

Adding a new service (protocol) to switch 140 merely requires adding support for an additional two translations. This may be implemented by adding functionality that supports translation from the new protocol-specific format to the canonical packet format in the ingress processing engine, and adding functionality that supports translation from the canonical packet format to the new protocol-specific format in the egress processing engine. For example, to add Ethernet service to the switch, from a data plane perspective, support for Ethernet-to-canonical packet format and canonical packet format-to-Ethernet translations are the functions to be added to existing processing engines in switch 140.

FIG. 2 is a physical diagram of switch 140 illustrating a data path for the ingress and egress flow of data. Pooling switch 258 and fabric 280 are located on a switch fabric module 290. Link interfaces 250 and 256 and processing engines 260 and 262 are coupled to pooling switch 258. A data packet enters on ingress link interface 250 and is sent to ingress processing engine 262 via pooling switch 258. Ingress processing engine 262 translates the packet from a first protocol-specific format (as determined by ingress link interface 250) to a canonical packet format. The packet is then sent to egress processing engine 260 via fabric 280. Egress processing engine 260 translates the packet from the canonical packet format to a second protocol-specific format (as determined by egress link interface 256). The packet is finally sent to egress link interface 256 via pooling switch 258.

FIG. 3A is a logical diagram illustrating an improved protocol translation method in a switch with processing engines, such as switch 140. Ingress processing engines 300 -304 translate data from a first protocol-specific format to canonical packet format 306. Egress processing engines 308-312 translate data from canonical packet format 306 to a second protocol-specific format. For example, ingress processing engine 300 may receive a frame relay packet. Ingress processing engine 300 translates the frame relay packet to canonical packet format 306. Egress processing engine 312 may receive the canonical packet and translate it to an Ethernet packet. This accomplishes the packet translation from Frame Relay frames to Ethernet frames.

FIG. 3B is a flowchart illustrating a process for the ingress and egress flow of data through the processing engines depicted in FIG. 3A. During ingress, data arrives at an ingress processing engine. The ingress processing engine receives and processes the data (step 350) from an ingress line interface. The data is in a first protocol-specific format. For example, the data could be formatted according to the Frame Relay protocol if it comes from a Frame Relay link interface. The ingress processing engine translates the data from the first protocol-specific format to canonical packet format 306 (step 352). The ingress processing engine processes data (step 354), such as performing traffic policing, and puts it in an appropriate data format for switching to an egress processing engine (step 358) via switching fabric 360. The data arrives at the egress processing engine. The egress processing engine processes and reads the data (step 362) which is in canonical packet format 306. The egress processing engine processes (step 364) and translates the data from canonical packet format 306 to a second protocol-specific format (step 366), and then processes and sends out the data (step 368) to an egress line interface. For example, the second protocol could be ATM. Other embodiments may perform different and/or additional steps. In addition, the steps may be performed in a different order. For example, processing (step 354) may be performed before protocol translation (step 352). Similarly, steps 364 and 366 may be swapped.

FIG. 4 is a block diagram illustrating a processing engine that uses the improved protocol translation method, such as processing engine 160, 162, 164, or 166 in switch 140. In one embodiment, each processing engine is implemented on a PCB. In one implementation, each processing engine supports all of the protocols supported by switch 140. Although FIG. 4 is described with respect to processing engine 160, the description applies to all processing engines in switch 140. Processing engine 160 includes network processor 438 coupled to exchange information with fabric plane interface 436 and pooling switch plane interface 442. Network processor 438 includes flow classification 433, packet translation 435, traffic management 437, as well as other components as required. Interface 442 is coupled to pooling switch plane 452 to exchange data between processing engine 160 and pooling switch 158. Interface 436 is coupled to fabric plane 454 to exchange data between processing engine 160 and fabric 180.

During data ingress, interface 442 receives data provided on pooling switch plane 452. Interface 442 provides the data to network processor 438. Translator 435 translates the data from a first protocol-specific format to the canonical packet format and network processor 438 processes the data appropriately. Network processor 438 may further translate the data to communicate with fabric plane interface 436. For example, network processor 438 may generate fabric cells during data ingress and translate cells into packets during data egress. This can also be done by some external device other than network processor 438. Fabric plane interface 436 receives the data from network processor 438 and then transmits the data onto fabric plane 454.

During data egress, network processor 438 processes the data received from fabric plane 454 through fabric plane interface 436. Network processor 438 processes the data appropriately and translator 435 translates the received data from the canonical packet format to a second protocol-specific format. Network processor 438 passes the data to pooling switch plane 452 via pooling switch plane interface 442. Interface 442 places the data on plane 452, which carries the data to pooling switch 158.

Network processor 438 also carries out operations that support the applications running on switch 140, as discussed in U.S. patent application Ser. No. 10/447,825, which was previously incorporated by reference.

Figure 5:
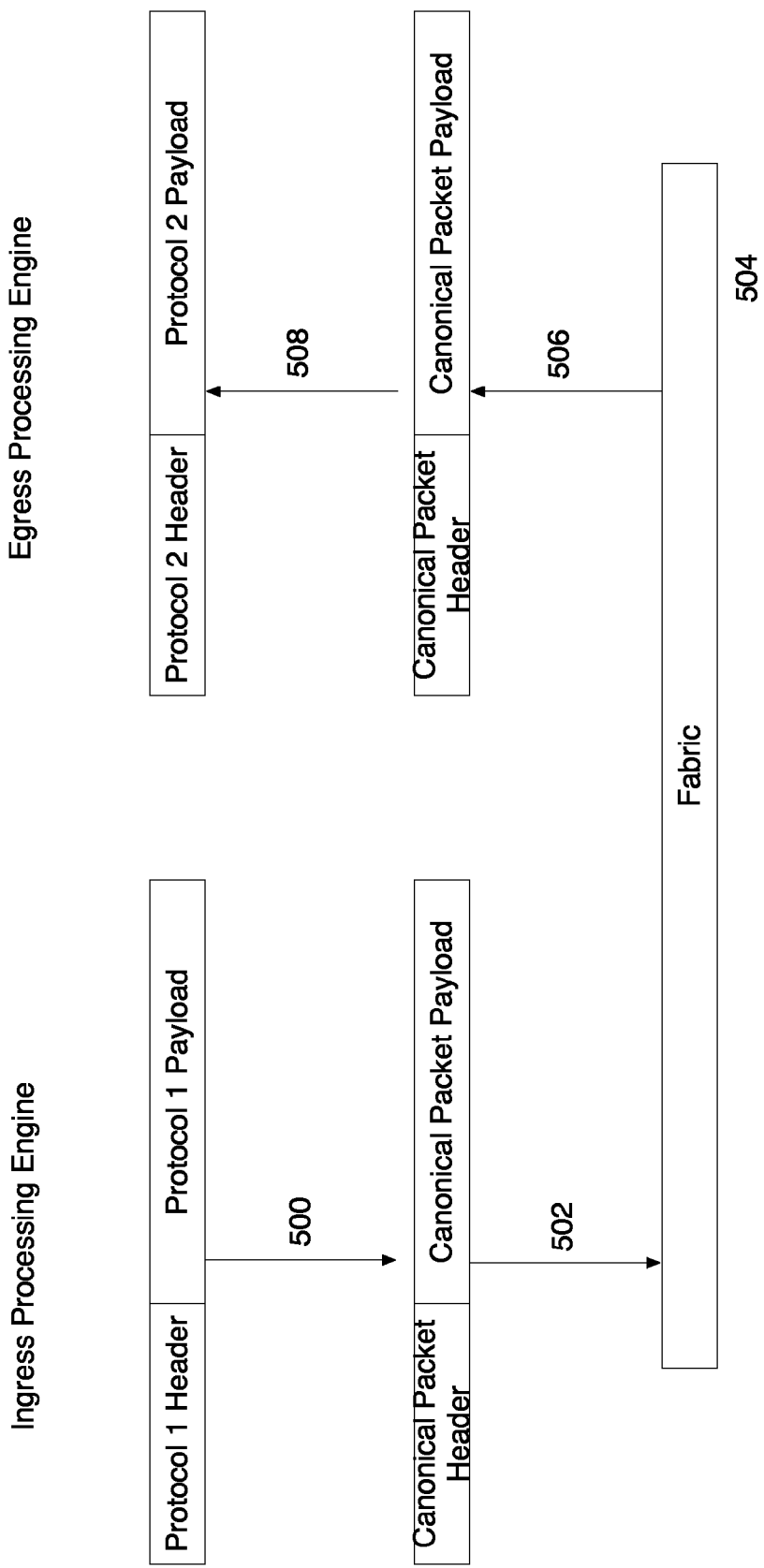
FIG. 5 is a packet format translation diagram illustrating the translation of a packet from a first protocol-specific format to a second protocol-specific format using the improved protocol translation method.

FIG. 5 is a packet format translation diagram illustrating the translation of a packet from a first protocol-specific format to a second protocol-specific format using the improved protocol translation method. During data ingress, the packet is translated (500) from a first protocol-specific format to a canonical packet format. The packet is sent (S02) via fabric 504 to an egress processing engine. The egress processing engine receives (506) the packet and translates (508) the packet from the canonical packet format to a second protocol-specific format. The payload data is generally not altered but in some embodiments, the payload data may be altered when translating between different protocols.

Figure 6:
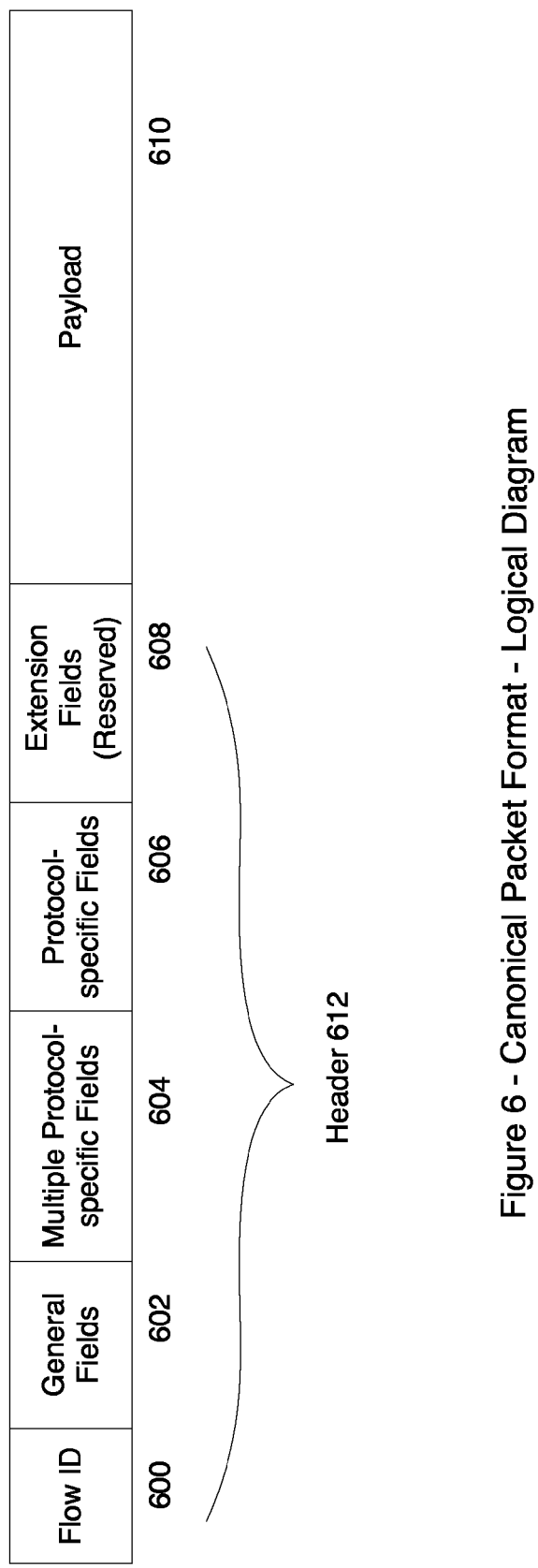
FIG. 6 is a logical diagram illustrating a typical canonical packet format with different fields and subfields.

FIG. 6 is a logical diagram illustrating a typical canonical packet format with different fields and subfields. The packet format includes a header field 612 and a payload field 610. Header field 612 includes flow ID 600, general fields 602, multiple protocol-specific fields 604, protocol-specific fields 606, and extension fields 608. Any number of subfields may comprise each of the fields 600-608. FIG. 6 is a logical diagram. Fields may not physically be located as depicted in FIG. 6. Subfields within a field may not be grouped adjacent to each other. For example, several non-adjacent subfields may comprise general fields 602 due to implementation considerations, and each of these subfields may be located at different locations within the packet header.

Flow ID 600 is an identifier that uniquely defines an incoming traffic flow within the switch. General fields 602 include subfields that are common to all the other protocols supported by the switch. For example, a priority indicator may be a subfield of general fields 602 because all protocol-specific formats such as ATM, Frame Relay, or Ethernet traffic include a priority indicator. Multiple protocol-specific fields 604 include subfields that are common to multiple, but not to all, protocols supported by the switch. For example, a congestion control indicator may be a subfield of multiple protocol-specific fields 604 because both AIM and Frame Relay packets include a congestion control indicator and there are other protocols (e.g., VLAN -based Ethernet service) that do not have such a congestion indicator. Protocol-specific fields 606 include subfields that may be specific to only one protocol supported by the switch. For example, a packet in canonical packet format may need to include a field to indicate that an Ethernet pause frame needs to be generated when the packet arrives at the Ethernet service side. This indicator may be a subfield of protocol-specific fields 606 which is relevant to the Ethernet protocol only. Extension fields 608 are reserved for future use. For example, in the future, a new standard -based service/protocol that requires additional fields may be supported by the switch. By designing in this way, the canonic packet format can be viewed as a "super-set" which is able to accommodate existing services and new services that may be introduced in future.

In other embodiments of the canonical packet format, fields or subfields may be shared to more efficiently pack the packet. Shared fields are referred to as common fields. For example, both the congestion control indicator and the pause number indicator may be located in a common field or in the same location (address) in the packet. Because an ATM or Frame Relay packet does not have a pause number indicator and an Ethernet packet does not have a congestion control indicator there will never be a conflict for the common field among these protocols.

Figure 7:
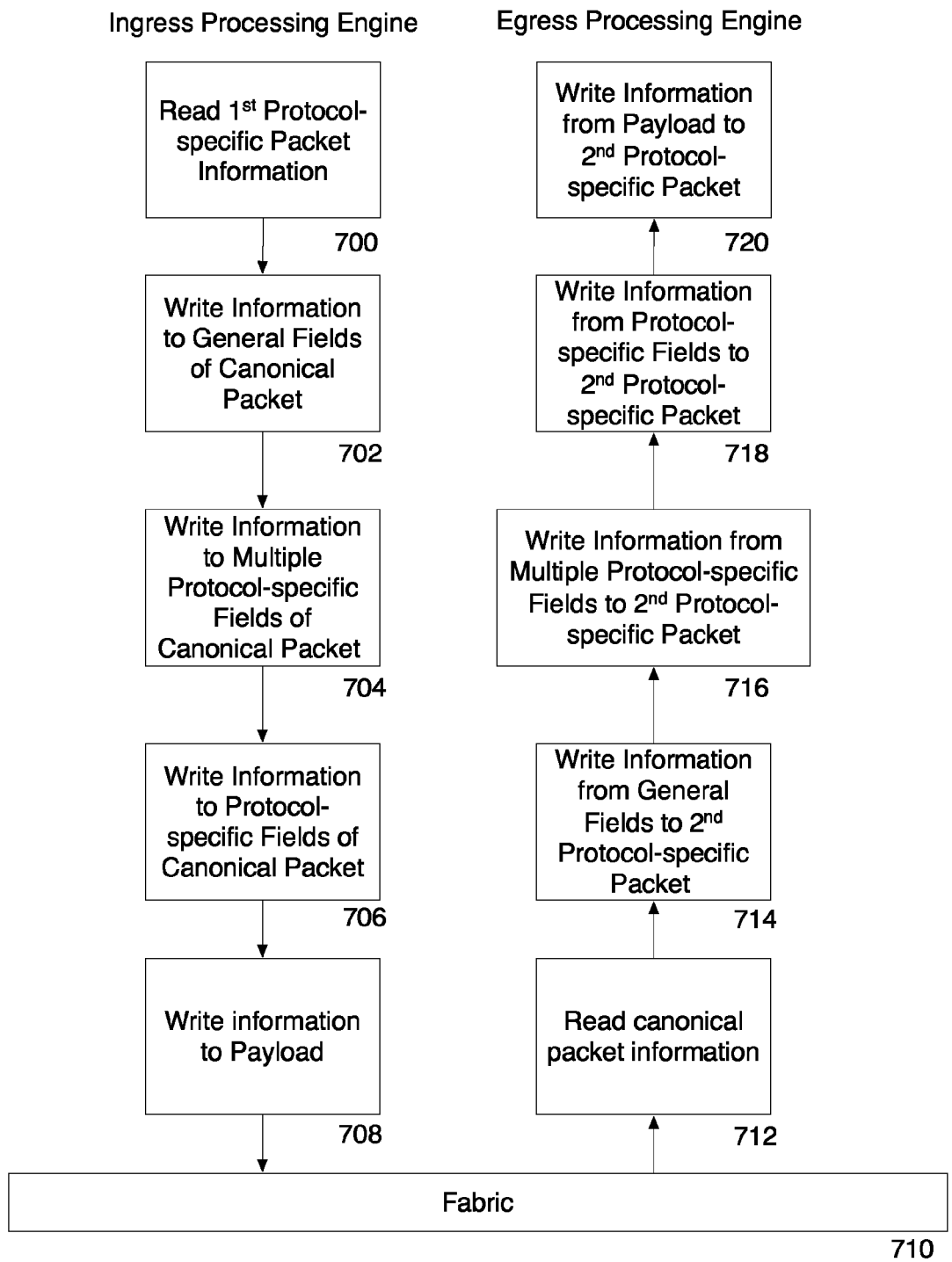
FIG. 7 is a flowchart illustrating a process for packet translation to and from a canonical packet.

FIG. 7 is a flowchart illustrating a process for packet translation to and from a canonical packet. During ingress, a packet arrives at an ingress processing engine. The packet is in a first protocol-specific format. For example, the data could be formatted according to the Ethernet protocol. The ingress processing engine reads and extracts the information from the incoming packet (step 700). The ingress processing engine writes the appropriate information according to some specific fields from the packet header in the protocol-specific format to the general fields of the canonical packet (step 702), to the multiple protocol-specific fields of the canonical packet (step 704), to the protocol-S specific fields of the canonical packet (step 706), and carries the payload of the arriving packet to the payload of the canonical packet (step 708). The payload data is generally not altered, but in some embodiments, the payload data from the first protocol-specific format packet (e.g., Frame Relay) may be pre-appended with some "header", e.g., MPLS inner (Martini) label, in addition to the second protocol-specific format (e.g., ATM) The ingress processing engine may further translate the data to communicate with fabric plane interface 436. For example, the ingress processing engine may generate fabric cells and the egress processing engine may translate fabric cells to packets.

The egress processing engine reads and extracts the information from the incoming packet (step 712). The egress processing engine writes the appropriate information to a second protocol-specific packet from the general fields of the second protocol-specific packet (step 714), multiple protocol-specific fields of the second protocol-specific packet (step 716), protocol-specific fields of the second protocol-specific packet (step 718), and the payload of the second protocol-specific packet (step 720). The payload data is generally not altered but in some embodiments, the payload data may be altered. In some embodiments, the payload data from first protocol-specific format packet (e.g., Frame Relay) may be pre-appended with some "header", e.g., MPLS inner (Martini) label, in addition to the second protocol-specific format (e.g., ATM). Other embodiments may perform different and/or additional steps. In addition, the steps may be performed in a different order.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method, comprising:
    translating a packet from a first protocol-specific format, of a set of protocol-specific formats supported by a network device, to a generic packet format yielding a generic packet, wherein
    the generic packet format is configured to be translated to any of the set of protocol-specific formats, and
    the generic packet format comprises a shared field configured to contain at least a first value associated with a first field of one of the protocol-specific formats and a second value associated with a second field of another of the protocol-specific formats, wherein the first field is different than the second field.

2. The method of claim 1, wherein the generic packet format comprises a multiple protocol-specific field associated with a first field that is common to multiple protocol-specific formats of the set and a protocol-specific field associated with a second field that is specific exclusively to one protocol-specific format of the set.

3. The method of claim 1, wherein the translating comprises translating by a network switch device that comprises a pooling switch.

4. The method of claim 1, wherein the translating comprises writing information associated with a protocol-specific field of the packet in the first protocol-specific format to a common field of the generic packet.

5. The method of claim 1, wherein the translating comprises:
    writing first information associated with a general field of the packet in the first protocol-specific format to a corresponding general field of the generic packet;
    writing second information associated with a common field of the packet in the first protocol-specific format to a corresponding common field of the generic packet;
    writing third information associated with a protocol-specific field of the packet in the first protocol-specific format to a corresponding protocol-specific field of the generic packet; and
    writing fourth information associated with a payload field of the packet in the first protocol-specific format to a corresponding payload field of the generic packet.

6. The method of claim 1, wherein at least one field of the generic packet format is shared by multiple protocol-specific formats of the set.

7. The method of claim 1, wherein the translating comprises first translating by an ingress processing engine that receives the packet from an ingress link interface of the network device, and the method further comprises second translating the generic packet, by an egress processing engine of the network device, from the generic packet format to one of the set of protocol-specific formats.

8. A network device, comprising:
    an ingress interface configured to receive a packet in a protocol-specific format of a set of protocol-specific formats supported by the network device; and an ingress processing engine configured to translate the packet from the protocol-specific format to a canonical packet format to yield a generic packet, wherein the canonical packet format is configured to be translated from the canonical packet format to any of the set of protocol-specific formats, and the canonical packet format comprises at least one shared field configured to
in response to a determination that the protocol-specific format is a first protocol-specific format, store at least a first value of a first field of the first protocol-specific format, and
in response to a determination that the protocol-specific format is a second protocol-specific format, store a second value of a second field of the second protocol-specific format.

9. The network device of claim 8, wherein the canonical packet format further comprises at least one general field corresponding to at least one first field that is common to all of the set of protocol-specific formats, at least one multiple protocol-specific field corresponding to at least one second field that is common a plurality of the set of protocol-specific formats less than all of the set of protocol-specific formats, and at least one protocol-specific field corresponding to at least one third field that is common to only one of the set of protocol-specific formats.

10. The network device of claim 8, further comprising an egress processing engine configured to translate the canonical packet format to any of the set of protocol-specific formats to yield a translated packet, and
an egress interface configured to send the converted packet.

11. A non-transitory computer-readable medium having stored thereon instructions that, in response to execution, cause a system to perform operations, comprising:
translating a packet from a protocol-specific format to a generic packet format to generate a generic packet that is translatable to any of a set of protocol-specific formats supported by a network device, wherein the translating comprises:
in response to a determination that the protocol-specific format is a first protocol-specific format, write a first value of a first field of the first protocol-specific format to a shared field of the generic packet format, and
in response to a determination that the protocol-specific format is a second protocol-specific format, write a second value of a second field of the second protocol-specific format to the shared field of the generic packet format, wherein the second field is different than the first field.

12. A method, comprising:
receiving a packet derived via translation of a protocol-specific format, of multiple protocol-specific formats supported by a network device, to a canonical packet format,
wherein the canonical packet format is translatable to any of the multiple protocol-specific formats, and comprises a shared field configured to:
in response to a determination that the protocol-specific format is a first protocol-specific format, store at least a first value of a first field of the first protocol-specific format, and
in response to a determination that the protocol-specific format is a second protocol-specific format, store a second value of a second field of the second protocol-specific format, wherein the second field performs a different function than the first field.

13. The method of claim 12, wherein the canonical packet format comprises a multiple protocol-specific field corresponding to a first field that is common to more than one of the multiple protocol-specific formats, and a protocol-specific field corresponding to a second field that is specific exclusively to one of the multiple protocol-specific formats.

14. The method of claim 12, further comprising translating the packet from the canonical packet format to one of the multiple protocol-specific formats by a network switch that comprises a pooling switch.

15. The method of claim 12, further comprising translating the packet from the canonical packet format to a target protocol-specific format of the multiple protocol-specific formats, wherein the translating comprises writing information associated with a common field of the packet to a protocol-specific field of a translated packet in the target protocol-specific format.

16. The method of claim 12, further comprising translating the packet from the canonical packet format to a target protocol-specific format, of the multiple protocol-specific formats, to yield a translated packet, wherein the translating comprises:
writing first information associated with a general field from the packet in the canonical packet format to a corresponding first field of the translated packet;
writing second information associated with a common field from the packet in the canonical packet format to a corresponding second field of the translated packet, wherein the common field corresponds to a first field that is common to the protocol-specific format and the target protocol-specific format;
writing third information associated with a protocol-specific field from the packet in the canonical packet format to a corresponding third field of the translated packet, wherein the protocol-specific field corresponds to a second field that is specific to the target protocol-specific format; and
writing fourth information associated with a payload field from the packet in the canonical packet format to a corresponding fourth field of the translated packet.

17. The method of claim 12, wherein at least one field of the canonical packet format is shared by more than one of the multiple protocol-specific formats.

18. A network device, comprising:
an ingress processing engine configured to translate a packet from a protocol-specific format, of a set of protocol-specific formats supported by the network device, to a canonical packet comprising a generic packet format capable of translation to any of the set of protocol-specific formats; and
an egress processing engine configured to translate the canonical packet to a selected protocol-specific format of the set of protocol-specific formats,
wherein the canonical packet comprises a shared field configured to contain at least a first value associated with a first field of one of the protocol-specific formats and a second value associated with a second field of another of the protocol-specific formats, wherein the first field is different than the second field.

19. A non-transitory computer-readable medium having stored thereon instructions that, in response to execution, cause a computing device to perform operations, comprising:
receiving a packet that has been translated from a protocol-specific format, of a set of protocol-specific formats, to a canonical packet comprising a generic packet format configured to be translated to any of the set of protocol-specific formats, wherein the generic packet format comprises a shared field configured to store a first value associated with a first field of a first of the protocol-specific formats and a second value associated with a second field of a second of the protocol-specific formats, and the first field is different than the second field; and translating the packet from the canonical packet format to another protocol-specific format of the set of protocol-specific formats.

* * * * *